July 18, 1967  C. A. LEVINE  3,331,758

METHOD OF COATING HOLLOW FIBERS

Filed April 11, 1966

INVENTOR.
Charles A. Levine
BY
Jerome Ruby
ATTORNEY

United States Patent Office 3,331,758
Patented July 18, 1967

3,331,758
METHOD OF COATING HOLLOW FIBERS
Charles A. Levine, Concord, Calif., assignor to The Dow Chemical Company, Midland, Mich., a corporation of Delaware
Filed Apr. 11, 1966, Ser. No. 559,357
7 Claims. (Cl. 204—20)

This application is a continuation-in-part of copending application for United States Letters Patent having Ser. No. 164,736, filed Jan. 8, 1962, and now abandoned.

This invention relates to the deposition of catalytic material on fibers of non-conducting materials.

An object of this invention is to provide a method for treatment of hollow, non-conducting, permeable fibers so as to deposit a uniform coating of catalytic material on either interior or exterior surfaces.

Other objects and advantages of the invention will be apparent during the course of the following description.

It is often desirable to treat permeable, non-conducting membranes so as to deposit catalytic materials on the surface of the membranes. Such treatment by known means becomes exceedingly difficult when the permeable membrane is in the form of a thin hollow fiber or tube. It is especially difficult to deposit the catalytic material on the inner surface of the tube. Fibers of this type may range in size from about a thousand microns O.D. down to a minimum outer diameter of about ten microns, having wall thicknesses down to about one micron.

With small fine hollow fibers, the standard techniques of applying catalytic coating to non-conductive materials give poor results at best. A spray treatment, for example, as in U.S. Patent 2,956,900 would be impractical and useless as a means of coating the inside surface of such a fiber. With non-conducting fiber material, coating by standard methods of electrolytic deposition such as are well-known in the plating industry, are not applicable to either inner or outer surfaces.

This invention provides a means by which a uniform coating of a catalytic material is applied to the inner and outer surfaces of a hollow, permeable, non-conducting fiber, as well as to other permeable, non-conducting materials in other shapes and sizes. The method applies to fibers having very small inner and outer diameters, as well as to material of greater dimension and diverse shapes.

In the accompanying drawing forming a part of this specification, and in which like numerals are employed to designate like parts throughout the same, FIG. 1 is an end view in section of a hollow fiber of ion exchange material of the type used in fuel cells.

When hollow fibers of ion-permeable materials are treated by the process of this invention, bundles of from several hundred to a million or more may be treated simultaneously. For simplicity, the description of the process here set forth will refer to a single hollow fiber 10. This fiber 10 may have an outer diameter of as little as 10 microns and a wall thickness as small as 1 micron. Larger fibers are more easily treated, the critical size for use of this process being the minimum size at which it will perform.

Figure 1:
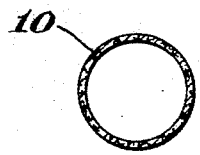
Figure 2:
FIG. 2 is an end view in section of a hollow fiber having its interior surface coated with conducting material.

A thin coating of a conductive metal such as nickel or silver is deposited on the inner surface of the hollow fiber illustrated in FIG. 1. This may be accomplished by chemical deposition as in the Brashear method, as described in greater detail subsequently herein and can be found in Kirk and Othmer, "Encyclopedia of Chemical Technology," Interscience Encyclopedia Inc., New York, 12, page 445 (1954), or the Rochelle Salt Method. The coating solution is drawn into the hollow fiber by immersing one end of the fiber therein and, by means of a vacuum applied to the other end, sucking the solution up through the fiber. A metallic deposit, 11, is formed on the inner surface of the fiber as shown in FIG. 2.

After a sufficient time, from 2 to 20 minutes depending on the temperature, the remaining solution is flushed from the center of the hollow fiber 10. If left for a longer time, the silver layer becomes thicker and finally will plug the tube. Provision is made, as follows, so that electrical connections with a conducting layer 11 may be maintained. This is done automatically if one end of the hollow fiber is immersed in the metalizing solution during the above treatment. The metal deposits on all surfaces in contact with the solution. Thus, a continuous metal deposit is formed from the inner metal layer to the outer area where a connection can be made as described later herein.

The fiber 10 is immersed in a standard nickel plating bath, described hereinafter, with the ends out of the solution, so that solution does not enter into the interior of the fiber or contact the terminal bands thereon of silver.

The inner conducting layer 11 of the hollow fiber 10 is then connected as described later herein through a direct current source to a suitable anodic material, preferably nickel also immersed in the plating bath. The polarity of the plating cell is such that the conductive inner layer 11 of the fiber 10 is a cathode in the plating cell. Current is run through the cell and metal from the bath is plated 12 through the permeable material and onto the convex surface of the inner conductive layer 11 between said layer 11 and the inner surface of the hollow fiber 10.

Metal ions migrate under the force of the electric potential through the permeable wall of the fiber 10 to plate 12 on the conductive layer 11. Metal does not plate on the fiber itself because the fiber being a non-conductor cannot supply the requisite electrons to the metal ions and reduce them to the free metallic condition. The conductive layer 11, although coherent, is thin enough and spongy-enough so that the new deposit 12 tends to compact layer 11 inward slightly.

Figure 3:
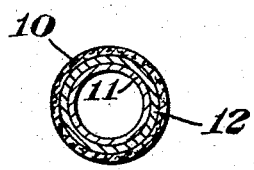
FIG. 3 is an end view in section of a hollow fiber as in FIG. 2 wherein a metal has been electroplated on the convex surface of the conducting material, thus being between the conducting material and the interior surface of the fiber.

When sufficient metal 12 has been plated on the conductive layer 11 as shown in FIG. 3, the current is shut off. The conductive layer is disconnected from the electrical circuit, and the fiber is removed from the plating bath. By sufficient metal is meant approximately twice as much as is needed to give good catalytic properties after sufficient treatment. This corresponds to a thickness of approximately 100 angstroms or more.

Figure 4:
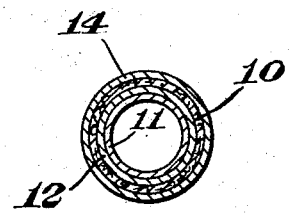
FIG. 4 is an end view in section of a hollow fiber as in FIG. 3 wherein the exterior surface of the fiber has been coated with a conducting material.
Figure 5:
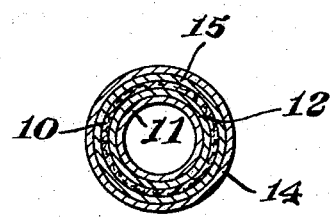
FIG. 5 is a plan view in section of a hollow fiber as in FIG. 4 wherein a metal has been electroplated on the concave surface of the conducting material and thus is between the outer conducting material and the exterior surface of the fiber.

After the fiber is rinsed, conductive material 14, such as is used to coat the inner surface of a fiber to give layer 11, for example, silver, is then deposited on the outer surface of the fiber 10 by Brashear or Rochelle salt treatment or other means to give the structure illustrated in FIG. 4. The fiber is rinsed again and immersed in aqueous solution. An electric potential is then set up between conducting layers 11 and 14 by means of a direct current power source. The polarity of the direct current source is such that the outer conducting layer 14 is cathodic and the inner conducting layer 11 is anodic. Metal ions formed from conductive layer 12 adjacent to permeable fiber 10 will migrate to the inner surface of the cathodic outer conducting layer 14. Thus, a layer of metal 15 is plated between the outer conducting layer 14 and the outer surface of the permeable fiber 10 giving the cross-sectional structure shown in FIG. 5. Again, because of the nature of the chemically deposited layer 14, the insertion of layer 15 serves merely to "stretch" layer 14.

Alternatively, the hollow fiber tube may be filled with metal plating solution containing the ion desired for layer 15 prior to and during this last step. If there is also plating solution on the outside of the coated fiber, care must be taken so as not to plate the metal on the outside of the outer conducting layer 14. This is accomplished by carefully controlling the current density. Further, if there is contact between the solution inside the fiber and solution outside the fiber, the plating cell within the fiber will be short circuited. Preferably, therefore, during the second plating operation, the core of the coated fiber is filled with plating solution to improve electrical conductivity between the anode and the cathode and the outside of the coated fiber is not immersed in any electrolyte.

A solution containing a desired catalyst, preferably platinum in ionic form or as a complex ion, is prepared. This may be a simple dilute solution of chloroplatinic acid in water. The coated and plated fiber is then fully immersed in the catalyst solution. The catalyst is deposited from the solution primarily by the chemical action of the metal on the inner and outer surfaces of the fiber. It deposits on and in the metal layers 12 and 15, due to the well-known fact that platinum is more noble than nickel and the like and due to the spongy, permeable nature of the chemically and electrolytically deposited layers. Thus, in the instant process, platinum replaces some of the nickel which then goes into solution as the ion.

It will be apparent to those skilled in the art that the metal plating on the fiber must have an electrode potential which will allow the catalytic material to deposit from solution. The conductive material 11 and 14 should have an electro-potential such that it will not cause a significant deposition of the catalytic material relative to the rate at which the plated metal 12 and 15 cause deposition.

The deposit of conducting material on the permeable fiber surfaces is very thin and is itself porous. Similarly, with the metal plate, so that the coated and plated fiber retains much of its initial permeability. Also, the boundaries between the metal plate and the conductive coating are not as sharp and distinct as schematically shown in the accompanying drawings. In reality, these layers are very thin, and due to their porosity are intermingled somewhat at their boundaries. Thus, the catalytic material is impeded but little in replacing the metal 12 and 15 and putting said metal into solution, so long as it has the correct electrode potential.

In the final product, the catalytic material is in close conjunction with both the conducting material and the ion permeable membrane. Permeability of the fiber and the various coatings is retained to a degree sufficient to allow the passage of ions from the innermost surface to the outside of the coated fiber, or vice versa, depending on the application and use to which the coated fiber is put.

In the practice of the present invention it may be useful to omit the last step in the process, i.e., the coating of the fiber with the catalyst material. An operable fuel cell comprising hollow fibers coated in the manner indicated, without the added step of coating with the platinum catalyst, is very satisfactory. However, for optimum results, the full five step procedure is most preferred.

The permeable fiber may be of any non-conducting material commonly used in ion exchange, fuel cells, and the like. These fine hollow fibers are formed in a number of different ways, depending on the material from which the fiber is made.

A sulfonated polyethylene fine hollow fiber can be made as follows: Polyethylene is melt spun into hollow fiber form and either used "as is" or drawn down into small size. A typical size commonly made and used in the medical field is 0.015″ ID x 0.043″ OD. By hot and/or cold drawing, extremely small size can be obtained, even from relatively large spinnerettes.

The polyethylene hollow fibers are swollen by immersion into boiling dichloromethane for one minute, and then immersed into a solution of 10 percent chlorosulfonic acid in dichloromethane and heated. The amount of sulfonation depends on the crystallinity of the polyethylene and the temperature and time of the soak in the chlorosulfonic mixture. As a typical result, however, a soak of 4 hours at 16° C. gave a sulfonic acid graft on the polyethylene such that the polymer exhibited an ion exchange capacity of about 2 milliequivalents per gram.

Alternatively, styrene may be grafted on the fine hollow polyethylene fibers. This can be done by a number of well-known techniques, such as by radiation treatment as described in Chapiro, "Radiation Chemistry of Polymeric Systems," Interscience (1962). The styrene-grafted polyethylene can then be treated with sulfonating agents to sulfonate the polystyrenes side chains on the polyethylene backbone.

Polyvinyl fluoride hollow fibers can be sulfonated in much the same way as the polyethylene, using different sulfonation conditions. Using 10 percent chlorosulfonic acid in dichloromethane, for example, immersion of the polyvinyl fluoride for 15 minutes at room temperature results in 2.0 milliequivalents per gram ion exchange capacity.

Depending on the choice of catalytic material to be deposited on the surfaces of the permeable material, the conductive coating should be chosen from those materials which are known to adapt to non-electrolytic deposition and will not rapidly replace the catalytic material in solution. The amount required is that sufficient to give a continuous conducting layer. Ordinarily this will be a thickness of approximately 0.5 micron or more. Metal plated inside the conductive coating should be in an amount at least sufficient to provide for deposition of the desired amount of catalytic material, and have an electrode potential such that it will readily replace the catalytic material in solution. But the potential should not be so high that the metal will go into solution of its own accord. The amount of catalytic material desired is of the order of 0.04 mg. per square centimeter or more.

The method of this invention applies to other than hollow fiber-shaped membranes. The procedures and techniques employed are similar. In a flat membrane, first one side is coated with conducting material and then the metal plated through the membrane from the second side. Then the second side is coated with conducting material and the plating on the inner surface of that coating is accomplished as previously described by reversing the polarity. For optimum results in using the coated membranes, it is preferable to immerse the thus-coated membranes into a catalyst-containing solution, until a desired amount of catalyst is deposited.

Thus, it may be readily seen that the method of this invention has wide applicability and is not restricted to hollow fibers for its use.

The following example is set forth to illustrate but is not to be construed to limit the operation and advantages of this invention.

A hollow fiber of anion exchange material was prepared as follows and subjected to the process of this invention. Again, for convenience, reference will be made to only one fiber, although the process may be carried out simultaneously on an entire assembly of fibers.

Polyethylene hollow fibers of the appropriate size are swollen in methylene dichloride. The methylene dichloride is then made to 10 percent in chlorosulfonic acid and the swollen fibers heated in the gently refluxed mixture for 30 minutes. The resulting chlorosulfonated polyethylene is washed in methylene dichloride and then immersed in a solution of 30 percent ethylene diamine and held at room temperature for 12 hours. The resulting material is quaternized with a 50 percent alcoholic solution of ethylene dibromide. The anion exchange fiber, prepared as above, was subjected to five steps of treatment:

Step 1

Silver was deposited on the interior surface of a 20 cm. length of hollow fiber about 150 microns O.D. and 80 microns I.D. by the Brashear method. This was carried out as follows. In the Brashear method, two solutions are made up. One, a reducing solution is made by mixing 90 gms. granulated sugar, 4 mls. concentrated nitric acid, and 1 liter water, boiling for 5 minutes and then adding 175 mls. of alcohol. The other solution, the silvering solution, is made by adding 400 mls. water, 20 gms. silver nitrate and 10 gms. potassium hydroxide. Just prior to silvering, concentrated ammonium hydroxide is added to the silvering solution until the precipitate originally formed just barely clears up, then to 4 volumes of the treated silvering solution is added 1 volume of the reducing sugar solution. The silvering solution was drawn up by vacuum into the core of the hollow fiber. After 20 minutes at room temperature it was determined by microscopic examination and resistance measurement that enough silver to give a complete and conductive coating on the interior surface of the fiber had been deposited. The residual solution was removed by flushing. At this stage, the silver coating covered the interior and extended over one end to a thin band on the exterior of the fiber.

Step 2

Electrical connections to the conductive silver layer were provided and the fiber was immersed in a standard nickel plating bath, containing a nickel anode with both open ends of the fiber outside of the bath. The bath consisted of a solution of 30 gms. nickel sulfate, 3 gms. boric acid, 100 mls. water. The electrical connection was made through a direct current source between the conductive silver layer of the fiber and the nickel anode. Polarity was such that the silver layer was cathodic. Nickel was then electroplated through the permeable membrane fiber in an amount more than sufficient to provide a monomolecular layer on both surfaces of the fiber, plus enough to reduce the desired amount of platinum later to be applied. The nickel plating was done at a current density of 3 milliamperes/cm.$^2$ for 30 minutes, resulting in a calculated deposit of 3 mg. Ni per cm.$^2$. The current density was calculated from the area of the internal surface of the fiber. Since the fiber was 20.3 cm. long and 80 microns I.D., the internal area was about 0.51 cm.$^2$. The current used was 1.5 milliamperes.

Step 3

After sufficient nickel had been plated, as indicated above, the current was shut off and the fiber removed from the plating bath. After washing with water, the outer surface of the fiber was coated with silver by the Brashear method in an amount sufficient to give a continuous conductive coating. For this step, a fresh Brashear solution was made up and the fiber placed in a solution so that the ends were external to the solution. After 5 minutes at room temperature, a coherent conductive coating was obtained. Care was taken to prevent the new exterior plating from contacting the terminal exterior bands of plated area previously formed in contact with the internal coating.

Step 4

After rinsing, the tube was then filled with the nickel electroplating solution, described previously, and the conducting layers electrically connected to a direct current source so that the outer layer was cathodic and the inner layer was anodic. The solution remaining in the porous fiber was conductive enough to allow some of the nickel previously deposited on the inner conductive layer to electroplate on the inner surface of the outer conducting layer. The magnitude and duration of the current was controlled so that about half of the nickel previously deposited was redeposited on the inner surface of the outer conducting layer.

Step 5

The thus treated hollow fiber was rinsed and soaked in a dilute solution of 1 percent chloroplatinic acid in water for about 5 minutes to accomplish the desired deposition of the platinum. Here 0.2 mg. of platinum per square centimeter was uniformly applied to the inner and outer surface of the hollow fiber, replacing nickel which went into solution as the nickel ion. Removal of the fiber from the dilute solution of chloroplatinic acid and rinsing completed the process.

Examination of the so-treated hollow permeable fiber by X-ray diffraction techniques showed that the inner and outer surfaces of the fiber was coated with an intimate but porous layer of platinum, nickel, and silver. Permeability of the fiber had diminished but little by virtue of the treatment.

If, after step 1, and prior to step 2, the outside of the hollow fiber is coated with silver using step 3 and hydrogen and oxygen are fed as gases, one to each surface, a fue cell is produced, having a reversible open circuit voltage of about 0.01 volt.

If the fiber from step 4 (unplatinized but coated with nickel and silver) is utilized as a fuel cell assembly by passing hydrogen into the interior of the fiber and oxygen over the exterior, a maximum voltage output of 0.27 volt at open circuit is obtained. Under load with the current density about 0.005 milliamp per square centimeter, the voltage drop across the fiber cell is 0.16 volt.

A fiber as treated in accordance with this invention, i.e., plated with a conductor and then platinized as described, when used as a fuel cell with hydrogen and oxygen gases gave an open circuit reversible potential of 0.65 volt. Under load with a current density of 0.07 miliamp per square centimeter, the voltage is 0.32 volt.

When hollow fibers are treated in bundles or assemblies containing a large number of individual fibers, the mechanics of the process steps are somewhat altered to accommodate simultaneous treatment. The general steps, however, remain the same. Thus, the method of this invention is applicable to the single fibers, or assemblies of large numbers of fibers.

Various modifications may be made in the present invention without departing from the spirit or scope thereof, and it is to be understood that I limit myself only as defined in the appended claims.

I claim:
1. A method for the deposition of catalytic material on thin, permeable, non-conducting material which comprises:
   coating one side of the permeable, non-conducting material with a porous layer of conducting material by a non-electrolytic deposition process;
   making the conducting layer cathodic and electroplating a suitable metal through the permeable non-conductor to form a porous layer on the surface of the conductive layer, between said conductive layer and the permeable non-conductor;

coating the other side of the permeable, non-conducting material with a porous layer of conducting material by a non-electrolytic deposition process;

electroplating the metal from the first metallic layer to the inner surface of the second conductive layer, to form a porous layer between the conductive layer and the permeable, non-conducting material by making the second conductive layer cathodic and the first conductive and metallic layers anodic, and passing current through the permeable material; and treating the thus-coated permeable, non-conducting material with a catalyst-containing solution so that catalytic material is deposited on both sides of the previously treated permeable, non-conducting material.

2. The method of claim 1 wherein the permeable, non-conducting material is a hollow fiber.

3. The method of claim 1 wherein the porous conducting material is silver.

4. The method of calim 1 wherein the electroplated suitable metal is nickel.

5. The method of claim 1 wherein the catalyst in the last step is platinum.

6. A method for the deposition of catalytic material on the inner and outer surfaces of a permeable, non-conducting, hollow fiber which comprises;

coating the inner surface of the permeable, non-conducting hollow fiber with a porous layer of silver by a non-electrolytic deposition process;

making the silver layer cathodic and electroplating a suitable metal through the permeable fiber to form a porous layer on the surface of the silver layer, between the silver layer and the hollow fiber;

coating the outer surface of the permeable, hollow fiber with a porous layer of silver by a non-electrolytic deposition process;

electroplating the metal from the inner metallic layer to the inner surface of the outer silver layer, to form a porous layer between the outer silver layer and the permeable, non-conducting material by making the outer silver layer cathodic and the inner silver and metallic layers anodic, and passing current through the permeable material; and treating the thus-coated permeable fiber with a catalyst-containing solution so that catalytic material is deposited on both inner and outer surfaces of the previously treated permeably hollow fiber.

7. A method for the deposition of catalytic material on thin, permeable, non-conducting material which comprises:

coating one side of the permeable, non-conducting material with a porous layer of conducting material by a non-electrolytic deposition process;

making the conducting layer cathodic and electroplating a suitable metal through the permeable non-conductor to form a porous layer on the surface of the conductive layer, between said conductive layer and the permeable non-conductor;

coating the other side of the permeable, non-conducting material with a porous layer of conducting material by a non-electrolytic deposition process; and electroplating the metal from the first metallic layer to the inner surface of the second conductive layer, to form a porous layer between the conductive layer and the permeable, non-conducting material by making the second conductive layer cathodic and the first conductive and metallic layers anodic, and passing current through the permeable material.

References Cited

UNITED STATES PATENTS

| | | | |
|---|---|---|---|
| 2,913,511 | 11/1959 | Grubb | 136—86 |
| 3,228,797 | 1/1966 | Brown et al. | 204—38 |

JOHN H. MACK, *Primary Examiner.*

T. TUFARIELLO, *Assistant Examiner.*